(12) United States Patent
Bill

(10) Patent No.: US 10,596,867 B2
(45) Date of Patent: Mar. 24, 2020

(54) METHOD OF MONITORING THE PRESSURE OF AN AIRCRAFT TIRE

(71) Applicant: Airbus Operations Limited, Bristol (GB)

(72) Inventor: Andrew Bill, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 217 days.

(21) Appl. No.: 15/075,532

(22) Filed: Mar. 21, 2016

(65) Prior Publication Data
US 2016/0272021 A1     Sep. 22, 2016

(30) Foreign Application Priority Data

Mar. 20, 2015    (GB) .................................. 1504777.2

(51) Int. Cl.
*B60C 23/04*    (2006.01)
*G01K 11/00*    (2006.01)
(Continued)

(52) U.S. Cl.
CPC ...... *B60C 23/0476* (2013.01); *B60C 23/0408* (2013.01); *B60C 23/0474* (2013.01);
(Continued)

(58) Field of Classification Search
CPC ... B60C 23/005; B60C 23/007; B60C 23/008; B60C 23/009; B60C 23/0401;
(Continued)

(56) References Cited

U.S. PATENT DOCUMENTS

| 4,895,097 A | 1/1990 | Lechnir |
| 4,966,034 A | 10/1990 | Bock et al. |
| 2003/0070477 A1* | 4/2003 | Fischer ............... B60C 23/0408 73/146 |
| 2005/0241380 A1* | 11/2005 | Welch ..................... B60C 23/00 73/146 |

(Continued)

FOREIGN PATENT DOCUMENTS

| CN | 101003246 | 7/2007 |
| CN | 101049795 | 10/2007 |

(Continued)

OTHER PUBLICATIONS

English Notification of the First Office Action for Chinese Application No. 201610162301.3, 12 pages, dated Mar. 26, 2019.

*Primary Examiner* — Mouloucoulaye Inoussa
(74) *Attorney, Agent, or Firm* — Nixon & Vanderhye P.C.

(57) ABSTRACT

A method of monitoring the pressure of a tire of an aircraft, the method including: taking two or more pressure readings from the tire at different times; calculating an estimated deflation rate based on the pressure readings; and calculating a time for the tire to deflate to a reference pressure level based on the estimated deflation rate. Two or more temperature readings are each associated with one of the pressure readings, and the estimated deflation rate is calculated by normalising each pressure reading based on its associated temperature reading and a common reference temperature to obtain a temperature-normalised pressure reading, and calculating the estimated deflation rate based on the temperature-normalised pressure readings. The estimated deflation rate is compared with a threshold, and a warning provided if the estimated deflation rate exceeds the threshold.

18 Claims, 4 Drawing Sheets

(51) Int. Cl.
  *G01L 17/00* (2006.01)
  *G01M 17/02* (2006.01)

(52) U.S. Cl.
  CPC .......... *B60C 23/0486* (2013.01); *G01K 11/00* (2013.01); *G01L 17/00* (2013.01); *G01M 17/02* (2013.01); *B60C 2200/02* (2013.01)

(58) Field of Classification Search
  CPC ............ B60C 23/0408; B60C 23/0445; B60C 23/0454; B60C 23/0479; B60C 23/0476; B60C 23/0474; B60C 23/0486; G01M 17/02; G01C 21/3453
  USPC ............ 430/488, 441, 426.33, 442; 73/146; 701/29.1, 31.6, 31.7, 31.8, 31.9, 32.1, 701/29.2, 423, 439
  See application file for complete search history.

(56) References Cited

U.S. PATENT DOCUMENTS

| | | | |
|---|---|---|---|
| 2008/0042817 A1* | 2/2008 | Fogelstrom | B60C 23/009 340/442 |
| 2012/0296515 A1 | 11/2012 | Boss et al. | |
| 2015/0134194 A1* | 5/2015 | Beaujard | G07C 5/0808 701/31.7 |
| 2015/0134197 A1* | 5/2015 | Cahill | B60C 23/0476 701/33.7 |

FOREIGN PATENT DOCUMENTS

| | | |
|---|---|---|
| CN | 101362423 | 2/2009 |
| JP | 2005524054 | 8/2005 |
| WO | 2015028170 | 3/2015 |
| WO | 2015/143451 | 9/2015 |

\* cited by examiner

TYRE PRESSURE MONITORING REPORT

| AIRCRAFT ID AND FLIGHT DETAILS: ##### | DATE and TIME: ##### |
|---|---|

| AMBIENT TEMPERATURE [deg C] | ### |
|---|---|
| DESTINATION AIRPORT | |
| DESTINATION TEMPERATURE [deg C] | ### |
| NOSE LANDING GEAR NOMINAL PRESSURE REFERENCE VALUE WEIGHT ON WHEELS [psi] | ### |
| MAIN LANDING GEAR NOMINAL PRESSURE REFERENCE VALUE WEIGHT ON WHEELS [psi] | ### |

| WHEEL | TYRE PRESSURE [psi] | TYRE PRESSURE [%] | TYRE GAS TEMPERATURE [deg C] | TYRE PRESSURE WARNING | ESTIMATE TIME TO 100% [DAYS:HRS] | ESTIMATE TIME TO 95% [DAYS:HRS] | COLD TYRE PROTECTION | |
|---|---|---|---|---|---|---|---|---|
| | | | | | | | ESTIMATE PRESSURE AT AMBIENT [%] | ESTIMATE PRESSURE AT DESTINATION [%] |
| WHEEL NL | ### | ### | ### | WARNING / OK | ### | ### | ### | ### |
| WHEEL NR | ### | ### | ### | WARNING / OK | ### | ### | ### | ### |
| WHEEL 01 | ### | ### | ### | WARNING / OK | ### | ### | ### | ### |
| WHEEL 02 | ### | ### | ### | WARNING / OK | ### | ### | ### | ### |
| WHEEL 03 | ### | ### | ### | WARNING / OK | ### | ### | ### | ### |
| WHEEL 04 | ### | ### | ### | WARNING / OK | ### | ### | ### | ### |

Figure 6

METHOD OF MONITORING THE PRESSURE OF AN AIRCRAFT TIRE

RELATED APPLICATION

The present application claims priority to GB Patent Application Number 1504777.2, filed Mar. 20, 2015, the disclosure of which is entirely incorporated by reference.

FIELD OF THE INVENTION

The present invention relates to a method of monitoring the pressure of a tire of an aircraft, and apparatus for performing such a method.

BACKGROUND OF THE INVENTION

An aircraft tire monitoring system is disclosed in U.S. patent application publication 2008/0055060 A1. A sensor senses an operating parameter of the tire (such as pressure or temperature), and a signal related to the sensed parameter is transmitted to a reader located on or in an aircraft fuselage. The reader may also transmit some or all of the information to another device, such as a display.

SUMMARY OF THE INVENTION

A first aspect of the invention provides a method of monitoring the pressure of a tire of an aircraft, the method comprising: taking two or more pressure readings from the tire at different times; and calculating an estimated deflation rate based on the pressure readings.

A second aspect of the invention provides an apparatus for monitoring the pressure of a tire of an aircraft, the apparatus comprising: a pressure sensor for taking pressure readings from the tire at differ rent times; and a computer system configured to calculate an estimated deflation rate based on two or more of the pressure readings.

Optionally a time for the tire to deflate to a reference pressure level is estimated based on the estimated deflation rate. The estimated time can then be stored for later analysis and/or displayed to flight or maintenance crew to enable them to take appropriate action.

Optionally the estimated deflation rate is compared with a threshold, and a warning provided if the estimated deflation rate exceeds the threshold.

If a temperature of the tire remains constant between the different pressure readings, then they can be directly used to calculate the estimated deflation rate. More typically the method comprises for each pressure reading taking an associated temperature reading, and the estimated deflation rate is calculated by normalising each pressure reading based on its associated temperature reading and a common reference temperature to obtain a temperature-normalised pressure reading, and calculating the estimated deflation rate based on the temperature-normalised pressure readings. The temperature readings may be taken by a temperature sensor carried by a wheel on which the tire is mounted, for example, or by a temperature sensor in any other suitable location (for instance a brake temperature sensor, or an ambient temperature sensor). The temperature readings may be taken at the same time as their associated pressure readings, or shortly before or after their associated pressure readings.

The pressure readings may all be taken with the aircraft on the ground, or at least one of the pressure readings may be an in-flight pressure reading taken from the tire when the aircraft is in flight.

Typically at least one of the pressure readings is an in-flight pressure reading taken from the tire when the aircraft is in flight with the tire unloaded, and the estimated deflation rate is calculated by adjusting the in-flight pressure reading to take account of the tire being unloaded to obtain a load-adjusted in-flight pressure reading, and calculating the estimated deflation rate based on the load-adjusted in-flight pressure reading.

Optionally the in-flight pressure reading is normalised based on its associated temperature reading and the common reference temperature and also adjusted to take account of the tire being unloaded, to obtain a temperature-normalised and load-adjusted in-flight pressure reading, and the estimated deflation rate is calculated based on the temperature-normalised and load-adjusted in-flight pressure reading.

The estimated deflation rate may be calculated based on only two pressure readings, but more typically it is calculated based on three or more pressure readings taken from the tire at different times. Typically the estimate deflation rate is calculated by fitting a curve or straight line to the pressure readings, for instance by a least-squares fitting algorithm Optionally first and second times are estimated for the tire to deflate to first and second reference pressure levels (for instance 100% and 95% of a nominal reference pressure). Optionally the first and second times are displayed at the same time on a single display device.

Optionally the time for the tire to deflate to the reference pressure level is calculated by reducing a selected one of the pressure readings with respect to a lower temperature to obtain a temperature-adjusted pressure level, and calculating a time for the tire to deflate from the temperature-adjusted pressure level to the reference pressure level based on the estimated deflation rate.

BRIEF DESCRIPTION OF THE DRAWINGS

Embodiments of the invention will now be described with reference to the accompanying drawings, in which:

FIG. 6 is an example of a screen displayed by the cockpit computer system.

DETAILED DESCRIPTION OF EMBODIMENT(S)

Figure 1:
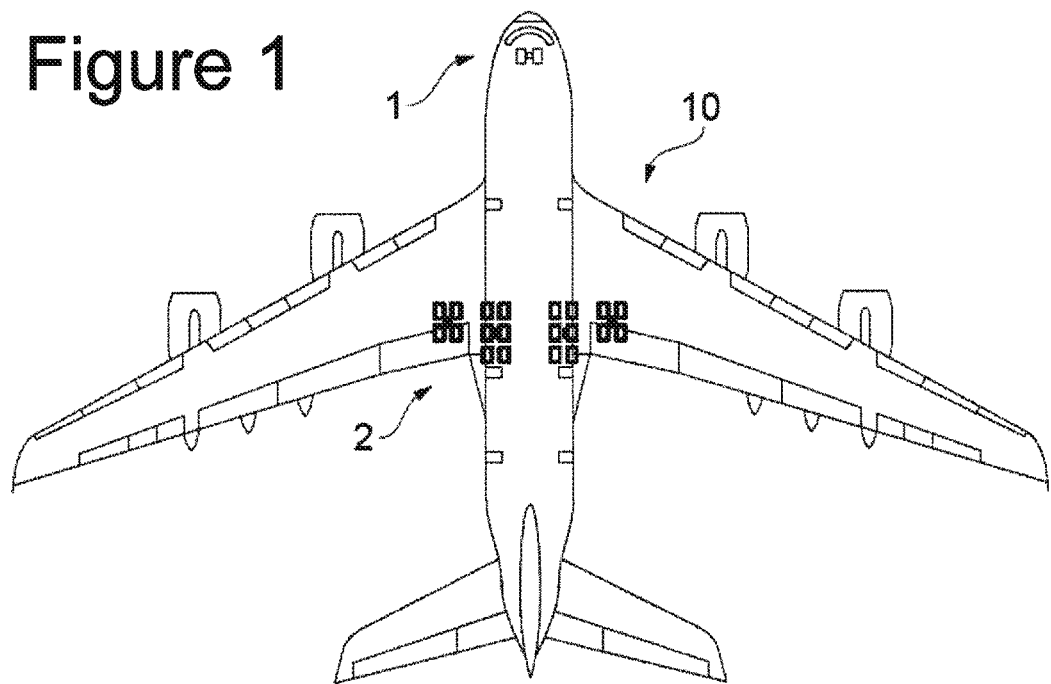
FIG. 1 is a plan view of an aircraft.
Figure 2:
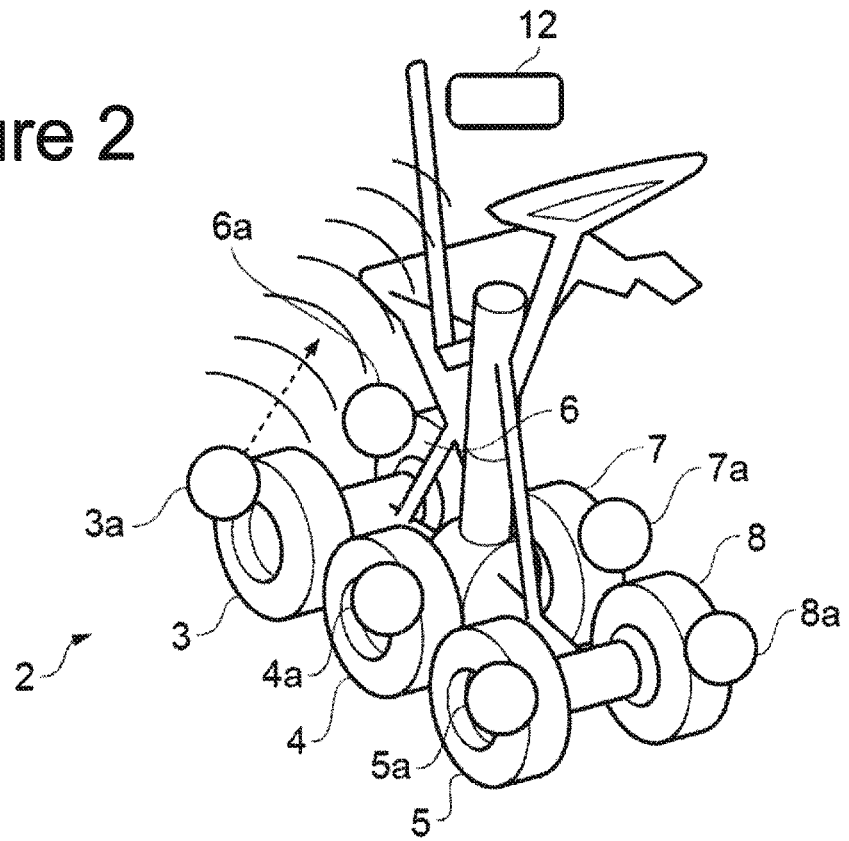
FIG. 2 shows one of the landing gears of the aircraft and its associated sensor systems.

FIG. 1 is a plan view of an aircraft 10 showing its landing gears: a nose landing gear (NLG) 1 and four main landing gears (MLGs) 2. FIG. 2 shows a landing gear system for one of its four MLGs, comprising six wheels, each wheel having a respective tire 3-8. Each wheel carries a respective sensor system 3a-8a for taking pressure and temperature readings from the wheel. All twenty two wheels of the aircraft have equivalent sensor systems.

Each sensor system 3a-8a has a wireless transmitter for wirelessly transmitting data to a receiver 12. The receiver 12 may either be mounted on a strut of the landing gear, or within a landing gear bay into which the landing gear retracts after take-off. Alternatively each sensor system 3a-8a may be wired to the receiver 12.

Figure 3:
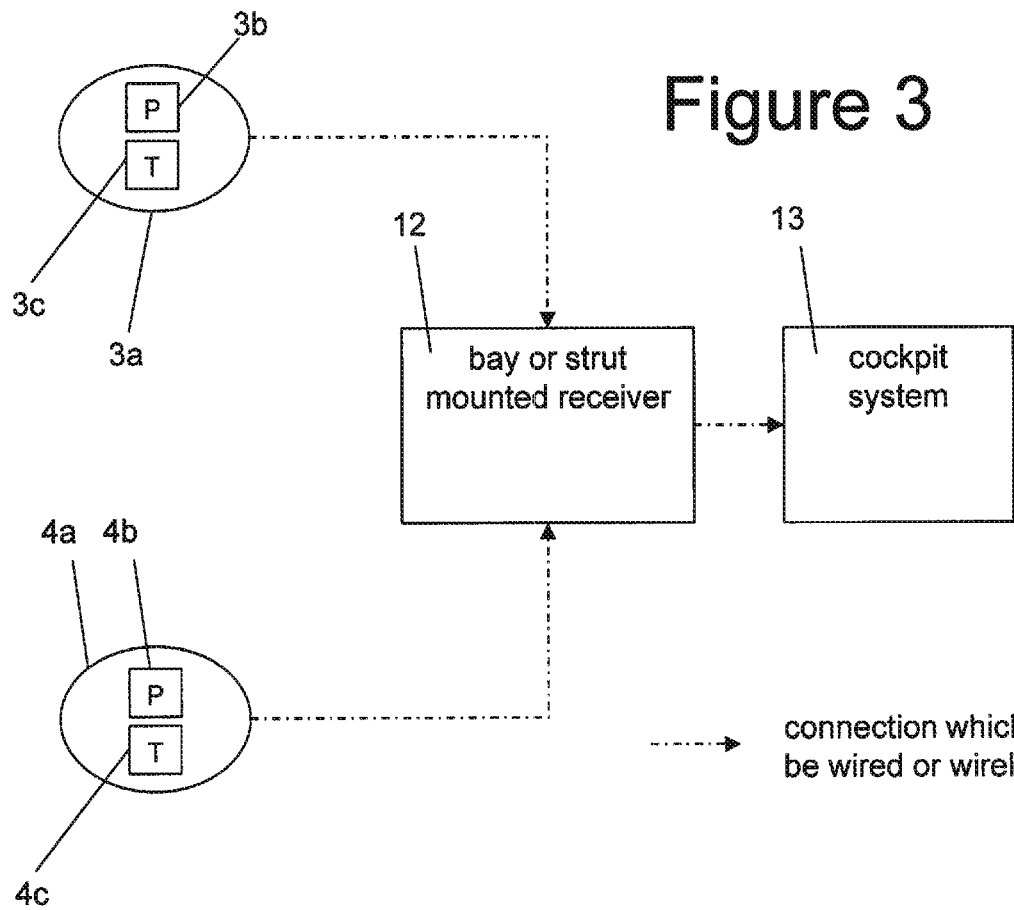
FIG. 3 shows two of the sensor systems connected to a cockpit computer system.

FIG. 3 is a schematic view of a system for checking the pressures of the tires of the aircraft 10. Only two of the sensor systems 3a, 4a are shown for purposes of clarity. Each sensor system comprises a pressure sensor 3b, 4b for measuring a pressure of the tire to generate pressure readings, and a temperature sensor 3c, 4c for measuring a temperature of the wheel to generate temperature readings. The receiver 12 receives the pressure and temperature readings via connections which may be either wired or wireless and forwards the readings to a cockpit computer system 13 in the cockpit of the aircraft via a connection which also may be wired or wireless.

Figure 4:
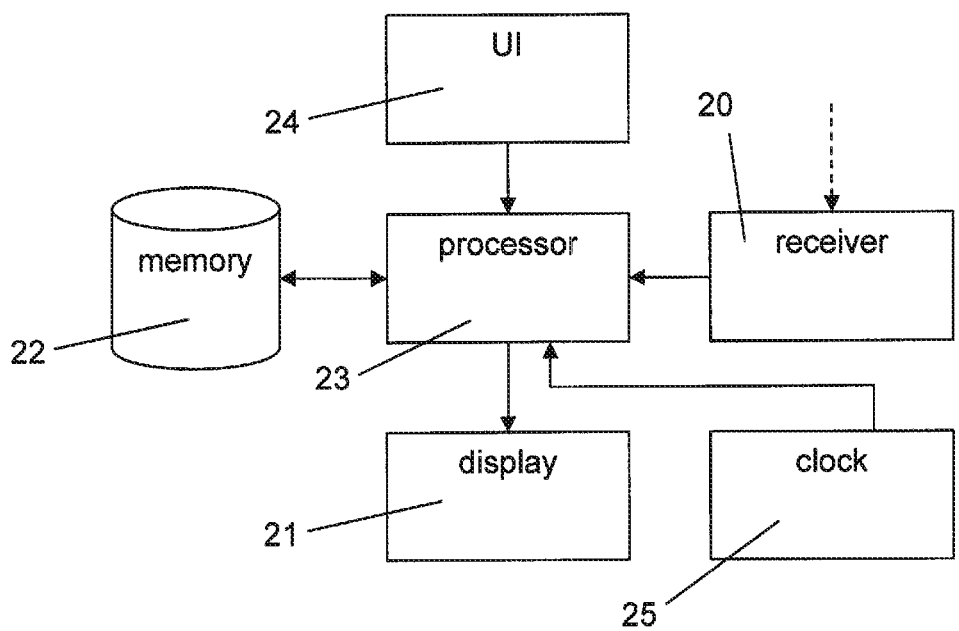
FIG. 4 shows some of the elements of the cockpit computer system.

FIG. 4 is a schematic view of some of the elements of the cockpit computer system 13. The system comprises a receiver 20 for receiving the pressure and temperature readings from the receiver 12; a display device 21; a memory 22; a processor 23; a user interface (UI) 24 such as a touch screen or keyboard; and a clock 25.

When the aircraft is on the ground before a flight, each sensor system 3a-8a is operated to simultaneously record the temperature of its associated wheel and the pressure of its associated tire. The associated ground pressure and temperature readings are transmitted to the cockpit system 13 and stored in the memory 22. Each ground pressure reading is also time-stamped based on a time reading from the clock 25.

Ground pressure readings are taken after a flight once the temperature readings are within 5° C. of ambient temperature (as measured by an ambient temperature sensor—not shown). Ground pressure readings are also taken shortly before a flight. The ground pressure readings are displayed on the display device 21, along with associated warnings if required.

Each ground pressure reading is also normalised based on its associated temperature reading and a common reference temperature of 15° C. to obtain a temperature-normalised ground pressure reading. This allows a direct comparison between pressure readings taken at different temperatures. The temperature-normalised ground pressure readings are calculated by using the fact that a 10° C. temperature change changes the tire pressure by approximately 3.7%. So for example if the ground pressure reading is 250 psi (pounds per square inch) and its associated temperature reading is 30° C., then the temperature-normalised ground pressure reading is calculated as: 250−[250*(15/10)*0.037]=250−13.875=236.125 psi.

If there is insufficient time for the temperature readings to reduce to within 5° C. of ambient temperature before the next flight, then ground pressure readings are taken 30 minutes after the last flight (at which point the wheels will still be hot from braking). In this case the ground pressure readings are adjusted to estimate the pressure at ambient temperature. So for example if the ground pressure reading is 240psi, its associated temperature reading is 50° C., and the ambient temperature is 20° C., then the ambient-temperature-adjusted ground pressure reading is calculated as: 240−[240*(30/10)*0.037]=240−26.64=213.36 psi.

This ambient-temperature-adjusted ground pressure reading is displayed on the display device 21, along with an associated warning if required.

At a later time, when the aircraft is in-flight, each sensor system 3a-8a is operated again to simultaneously record the temperature of its associated wheel and the pressure of its associated tire. The in-flight pressure and temperature readings are transmitted to the cockpit system 13 and stored in the memory 22 along with their time-stamps. When the aircraft is in the air, then the tires are unloaded so can be expected to reduce in pressure by about 4%. Therefore the in-flight pressure readings are not only normalised with respect to temperature, but also adjusted to take account of this unloading effect. So for example if the ground pressure reading immediately before the flight is 250 psi, the in-flight pressure reading is 220 psi, and the in-flight temperature reading is 10° C., then a temperature-normalised and load-adjusted in-flight pressure reading is calculated as: 220+[220*(5/10)*0.037]+[250*0.04]=220 +4.07+10=234.07 psi.

Finally, at a later time when the aircraft is back on the ground after a flight, a further set of temperature-normalised ground pressure readings are taken, one per tire, and recorded along with their time-stamps.

Figure 5:
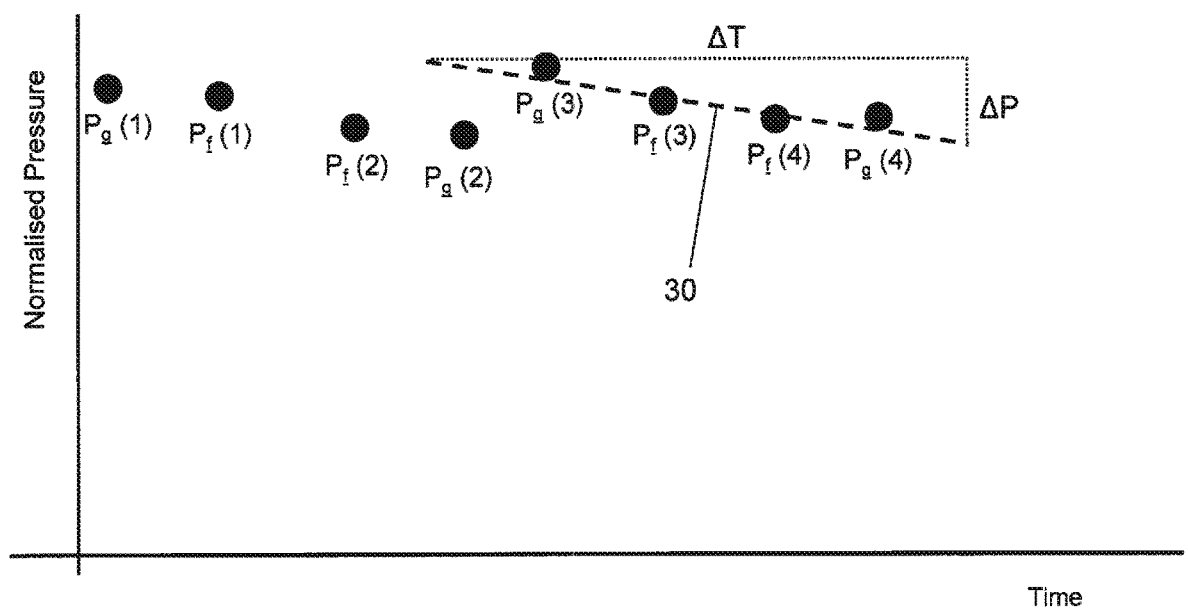
FIG. 5 is a graph showing eight pressure readings.

FIG. 5 is a graph showing a set of eight pressure readings. There are four temperature-normalised ground pressure readings $P_g(1)$-$P_g(4)$ and four temperature-normalised and load-adjusted in-flight pressure readings $P_f(1)$-$P_f(4)$. Between $P_g(2)$ and $P_g(3)$ the tire has been inflated. The processor 23 fits a straight line 30 to the last four pressure readings $P_g(3)$, $P_f(3)$, $P_f(4)$, $P_g(4)$ in order to determine an estimated deflation rate. The estimated deflation rate is calculated based on the last four pressure readings $P_g(3)$, $P_f(3)$, $P_f(4)$, $P_g(4)$, and the first four pressure readings $P_g(1)$, $P_f(1)$, $P_f(2)$, $P_g(2)$ are ignored since there has been a pressure increase of more than 5 psi between $P_g(2)$ and $P_g(3)$. Since all four of the pressure readings $P_g(3)$, $P_f(3)$, $P_f(4)$, $P_g(4)$ have been temperature-normalised to a common reference temperature of 15° C., and load adjusted by 4% if required, then they can be validly compared with each other to determine the deflation rate.

Any suitable method may be used to calculate the straight line 30—for instance least-squares fitting. The gradient of the straight line 30 gives an estimated deflation rate of $R=\Delta P/\Delta T$.

Estimated deflation rates are calculated for each tire. The processor 23 determines the tire with the highest deflation rate, and optionally compares the highest deflation rate with a threshold and provides a warning on the display device 21 if the estimated deflation rate exceeds a threshold. A suitable threshold may be for example a deflation rate which will result in a loss of pressure of more than 2% within 24 hours. So if the latest pressure reading is 250 psi, then a deflation rate greater than a threshold of (0.02*250)/24=0.208 psi/hr will result in a warning being displayed.

Table 1 below gives an example of a ground pressure reading of 250 psi taken with the wheel at a temperature of 20° C. The memory 22 stores a reference pressure level of 244 psi, and the ground pressure reading is compared with this reference pressure level to calculate a pressure percentage. So for a ground pressure reading of 250 psi the pressure percentage is 102%. Based on a deflation rate of 0.34 psi/hr, the pressure will reduce from 250 psi to the reference pressure level (244 psi) in 6 hours and to 95% of the reference pressure level in 53 hours. Note that in this case, since the wheel is at a relatively low temperature, the time for the tire to deflate to 100% and 95% is calculated starting from an initial pressure reading 250 psi, without first adjusting the initial pressure reading with respect to temperature. So in this case the time estimates of 6 hours and 53 hours are based on the assumption that the temperature does not change from 20° C.

TABLE 1

| | |
|---|---|
| Pressure reading (psi) | 250 |
| Pressure percentage (%) | 102 |

TABLE 1-continued

| | |
|---|---|
| Temperature (deg C.) | 20 |
| Deflation Rate (psi/hr) = | 0.34 |
| Pressure difference to reach 100% (244 psi) | 6 |
| Time to deflate to 100% (hr) | 18 hours |
| Pressure difference to reach 95% (232 psi) | 18 |
| Time to deflate to 95% (hr) | 53 |
| | 2 days 5 hours |

In the example of Table 1 the deflation rate of 0.34 psi/hr is greater than the threshold of (0.02*250)/24=0.208 psi/hr so a warning may be displayed in addition to the data presented in Table 1.

Table 2 below gives an example of a ground pressure reading of 300 psi taken with the wheel at a high temperature of 55° C. In this case, unlike in Table 1 above, the time for the tire to deflate to the reference pressure level is calculated by first reducing the pressure reading with respect to an ambient temperature reading (in this case 15° C.) taken by an ambient temperature sensor (not shown) to obtain a temperature-adjusted pressure level, and then calculating a time for the tire to deflate from this temperature-adjusted pressure level to the reference pressure level based on the estimated deflation rate. This gives a temperature-adjusted pressure reading of 256 psi (105%), and based on a deflation rate of 0.34 psi/hr, the pressure will reduce from 256 psi (105%) to the reference pressure level (244 psi) in 34 hours and to 95% of the reference pressure level in 69 hours. So in this case the time estimates are based on the assumption that the temperature reduces from 55° C. to the lower ambient temperature of 15° C. Note that the ambient temperature reading in this example is 15° C., which is coincidentally the same as the common reference temperature mentioned above used for calculating the estimated deflation rate. However this need not be the case, and the ambient temperature reading may instead be 10° C. or 20° C. for example.

TABLE 2

| | |
|---|---|
| Pressure reading (psi) | 300 |
| Pressure percentage (%) | 123 |
| Temperature (deg C.) | 55 |
| Pressure Loss per hour (psi/hr) = | 0.34 |
| Pressure Adjusted to ambient 15° C. (psi) | 256 |
| Pressure Adjusted to ambient 15° C. (%) | 105 |
| Pressure difference to reach 100% (244 psi) | 12 |
| Time to deflate to 100% (hr) | 34 |
| | 1 day 10 hours |
| Pressure difference to reach 95% (232 psi) | 24 |
| Time to deflate to 95% (hr) | 69 |
| | 2 days 21 hours |

FIG. 6 is an example of a display screen which can be presented to the flight crew on the display 21. Note that this display screen is for a different aircraft with only six wheels rather than twenty two (as in the example of FIG. 1). For each wheel, a tire pressure, pressure percentage and temperature are displayed along with the estimated time to reach 100% and 95%. The example of FIG. 6 presents the information in the form of a table, but alternatively the information may be displayed graphically.

The estimated time is based on the time stamp and actual pressure of the most recent pressure reading for each tire (rather than being based on the current time or a temperature-adjusted pressure reading).

If the percentage is below 100% then a warning is displayed in the column headed "TIRE PRESSURE WARNING".

The ambient temperature sensor (not shown) measures the current ambient temperature, which is displayed along with the name of the destination airport and the destination temperature at the expected arrival time. This destination temperature can be obtained automatically by the processor 23 by means of a weather forecast for the destination, or could be entered manually via the user interface 24.

Temperature-adjusted pressure readings are calculated based on the current ambient temperature, and displayed in the column headed "ESTIMATE PRESSURE AT AMBIENT". So for example if the ground pressure reading is 280 psi, its associated ground temperature reading is 50° C., and the ambient temperature is 20° C., then the estimated pressure at ambient is calculated as: 280−[280*(30/10) *0.037]=280−31.08=248.92 psi.

Temperature-adjusted pressure readings are also calculated based on the estimated destination temperature, and displayed in the column headed "ESTIMATE PRESSURE AT DESTINATION". So for example if the ground pressure reading is 280 psi, its associated ground temperature reading is 50° C., and the destination temperature is 0° C., then the estimated pressure at destination is calculated as: 280−[280* (50/10)*0.037]=280−51.8=228.2 psi.

A low estimated pressure at the destination may generate a warning which prompts ground crew to inflate the tire further before the flight.

The reference pressure levels for the wheels of the nose landing gear and the main landing gear (by which the pressure percentages are calculated) are also displayed.

The method described above may be implemented by the cockpit system 13, in cooperation with the sensor systems 3a-8a, or it may be implemented by a hand-held device (not shown) which is used by ground crew to interrogate the sensor systems 3a-8a and calculate and display the information shown in FIG. 6.

The tire pressure monitoring method described above is performed to provide a history of the tire pressure for each wheel and to provide advanced notification of impending problems and recommended actions: specifically it is possible to help predict when the next tire inflation will be required; to detect the onset of failures by monitoring the rate of pressure loss for each wheel and detecting higher than average deflation rates; and to detect poor tire inflation practices.

In the embodiment of the invention described above, wheel temperature sensors 3c, 4c are provided to generate wheel temperature readings for each wheel. Brake temperature sensors (not shown) are also provided for taking brake temperature readings for each wheel of the MLGs 2 (although there are no brakes, and hence no brake temperature sensors, for the NLG 1). If wheel temperature readings are not available (either if the wheel temperature sensors 3c, 4c are not working, or not provided) then the system may use brake or ambient temperature readings as a substitute for the wheel temperature readings by the following process. After a flight, ground pressure readings and associated brake and ambient temperature readings are taken once the brake temperature reading is the same as the ambient temperature reading +/−5° C. (as read by the ambient temperature sensor), or the brake temperature reading is equal to 5° C., or after 3 hours since last flight and the brake temperature reading is less than 50° C. For the MLGs 2 the ground pressure readings are normalised based on their associated brake temperature readings, and for the NLG 1 the ground pressure readings are normalised based on their associated ambient temperature readings.

If brake temperature readings are not available for a given tire then its tire pressure can be recorded at the same time as the pressure of its axle mate (i.e. the tire sharing the same axle). If the axle mate's temperature is also not available then the tire pressure is recorded when the last tire pressure on that landing gear is recorded.

The tire pressure readings and ambient temperature readings for each wheel of the NLG 1 are recorded when the readings for the MLGs 2 are taken. If no MLG readings have been taken (due to a quick turnaround) then tire pressure readings and ambient temperature readings for each wheel of the NLG 1 are recorded at engine start.

If the aircraft has been in flight for a long period of time, then when the processor 23 is notified that the landing gears are extending (indicating that the aircraft is coming in to land) this is used as a trigger to take in-flight pressure readings and associated brake temperature readings. This in-flight method only applies to the MLGs 2 since brake temperature readings are not available for the NLG 1.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or one do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. A method of monitoring the pressure of a tire of an aircraft by a computer system, the method comprising:
    taking two or more pressure readings from the tire at different times;
    calculating an estimated deflation rate of the tire based on the two or more pressure readings;
    comparing the estimated deflation rate with a threshold and displaying using a display device a warning if the estimated deflation rate exceeds the threshold;
    wherein at least one of the pressure readings is an in-flight pressure reading with the tire unloaded, and the other pressure reading is an on the ground pressure reading; and,
    wherein the ground pressure readings are taken between shortly before a flight and after a flight once the temperature readings are within 5° C. of ambient temperature.

2. The method of claim 1 further comprising calculating a time for the tire to deflate to a reference pressure level based on the estimated deflation rate.

3. The method of claim 2 further comprising displaying the time for the tire to deflate to the reference pressure level.

4. The method of claim 1, further comprising calculating a first time for the tire to deflate to a first reference pressure level based on the estimated deflation rate, and calculating a second time for the tire to deflate to a second reference pressure level based on the estimated deflation rate.

5. The method of claim 4 further comprising simultaneously displaying the first and second times on a single display device.

6. The method of claim 1 further comprising for each pressure reading taking an associated temperature reading, wherein the estimated deflation rate is calculated by normalising each pressure reading based on its associated temperature reading and a common reference temperature to obtain a temperature-normalised pressure reading, and calculating the estimated deflation rate based on the temperature-normalised pressure readings.

7. The method of claim 1 wherein the estimated deflation rate is calculated by adjusting the in-flight pressure reading to take account of the tire being unloaded to obtain a load-adjusted in-flight pressure reading, and calculating the estimated deflation rate based on the load-adjusted in-flight pressure reading.

8. The method of claim 6 wherein the in-flight pressure reading is normalised based on its associated temperature reading and the common reference temperature and also adjusted to take account of the tire being unloaded, to obtain a temperature-normalised and load-adjusted in-flight pressure reading, and the estimated deflation rate is calculated based on the temperature-normalised and load-adjusted in-flight pressure reading.

9. The method of claim 1, wherein the estimated deflation rate is calculated based on three or more pressure readings taken from the tire at different times.

10. The method of claim 1, wherein the estimated deflation rate is calculated by a computer system.

11. Apparatus for monitoring the pressure of a tire of an aircraft, the apparatus comprising:
    a pressure sensor for taking pressure readings from the tire at different times;
    a computer system configured to calculate an estimated deflation rate based on two or more of the pressure readings and compare the estimated deflation rate with a threshold to provide a warning if the estimated deflated rate exceeds the threshold;
    wherein at least one of the pressure readings is an in-flight pressure reading with the tire unloaded and the other pressure reading is an on the ground pressure reading; and,
    wherein the ground pressure reading are taken between shortly before a flight and after a flight once the temperature readings are within 5° C. of ambient temperature.

12. The apparatus of claim 11 wherein the computer system is configured to estimate a time for the tire to deflate to a reference pressure level based on the estimated deflation rate.

13. The apparatus of claim 11, wherein the computer system is configured to compare the estimated deflation rate with a threshold, and provide a warning if the estimated deflation rate exceeds the threshold.

14. The apparatus of claim 11 further comprising a temperature sensor for taking temperature readings, wherein the estimated deflation rate is calculated by normalising each pressure reading based on an associated temperature reading from the temperature sensor and a common reference temperature to obtain a temperature-normalised pressure reading, and the computer system is configured to calculate the estimated deflation rate based on the temperature-normalised pressure readings.

15. A method to monitor a gas temperature in a tire of an aircraft by a computer system, the method comprises:

measuring a pressure of a gas in the tire of the aircraft at each of two or more different points in time;

transmitting the measured pressures to a computing device;

calculating by the computing device a rate of deflation of the tire based on the measured pressures and the points in time at which the measurements were performed;

comparing the estimated deflation rate with a threshold and displaying using a display device a warning if the estimated deflation rate exceeds the threshold;

wherein at least one of the pressure readings is an in-flight pressure reading with the tire unloaded, and the other pressure reading is an on the ground pressure reading;

wherein the ground pressure readings are taken between shortly before a flight and after a flight once the temperature readings are within 5° C. of ambient temperature; and, displaying an alert on a display device associated with the computing device if the rate of deflation is greater than a threshold rate of deflation.

16. The method of claim 15 further comprising:

measuring a temperature of the gas in the tire at each of the two or more different points of time;

calculating by the computing device, for each of the two or more different points of time, an adjusted pressure in the tire based representing a predicted gas pressure in the tire for the gas at a reference temperature, wherein the reference temperature is used to calculated the adjusted pressure for all of the two or more different points of time, and the calculation of the rate of deflation is performed using the adjusted pressures each corresponding to one of the two or more different points of time.

17. The method of claim 15 wherein at least one of the different points in time corresponds to a time during which the aircraft is in flight and the tire is not supporting the aircraft, and the method further comprises:

calculating by the computing device an adjusted pressure based on the measured pressure corresponding to the time during which the tire is not supporting the aircraft, wherein the adjusted pressure represents a predicted gas pressure in the tire if the tire where supporting the aircraft, and the calculation of the rate of deflation is performed using the adjusted pressure for the time during which the tire is not supporting the aircraft.

18. The method of claim 17 further comprising:

measuring a temperature of the gas in the tire at each of the two or more different points of time;

calculating by the computing device, for each of the two or more different points of time, an temperature adjusted pressure in the tire based representing a predicted gas pressure in the tire for the gas at a reference temperature, wherein the reference temperature is used to calculated the temperature adjusted pressure for all of the two or more different points of time, and the calculation of the rate of deflation is performed using the temperature adjusted pressures each corresponding to one of the two or more different points of time.

* * * * *